No. 744,705. PATENTED NOV. 24, 1903.
J. Q. ADAMS.
GRINDING MILL.
APPLICATION FILED MAY 17, 1901.
NO MODEL. 4 SHEETS—SHEET 3.
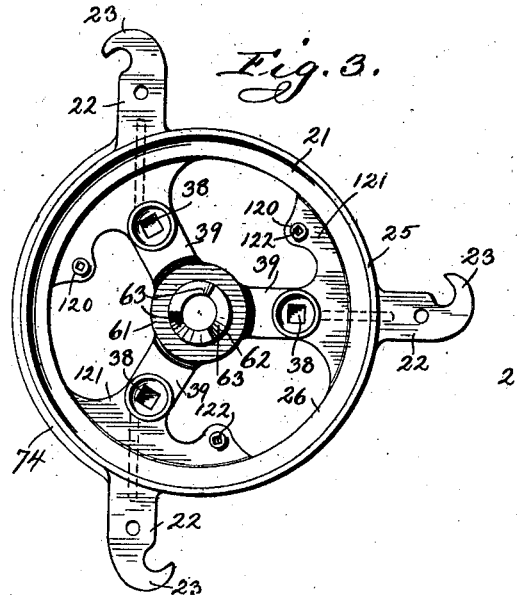
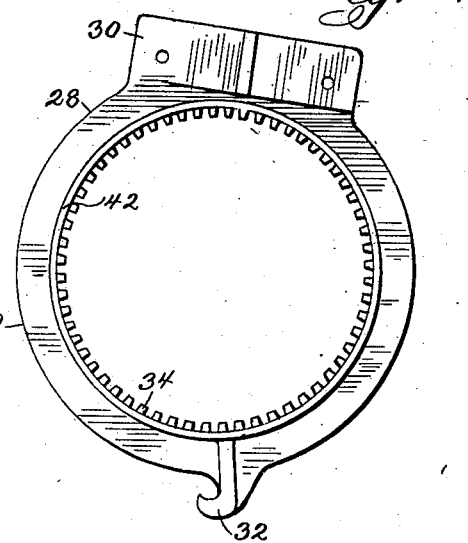
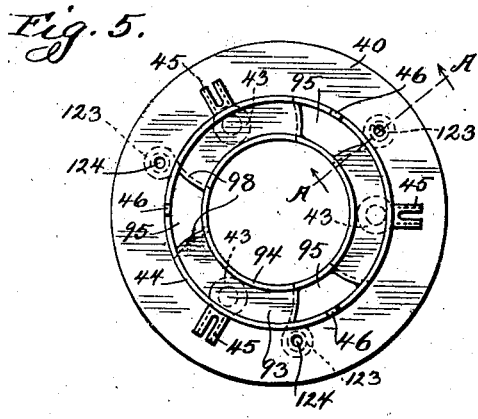
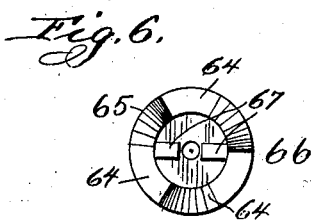
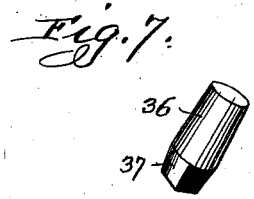
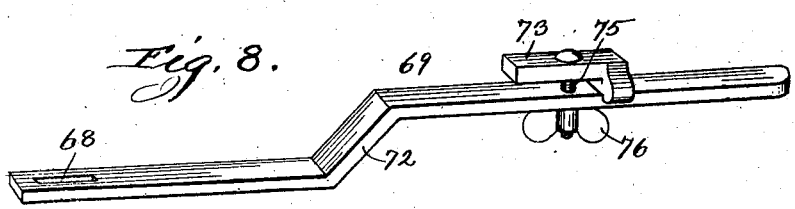
Witnesses:
R. J. Jacker
R. S. Clemage.
Inventor:
John Quincy Adams,
By Coburn, McRoberts & McElroy
Attys.

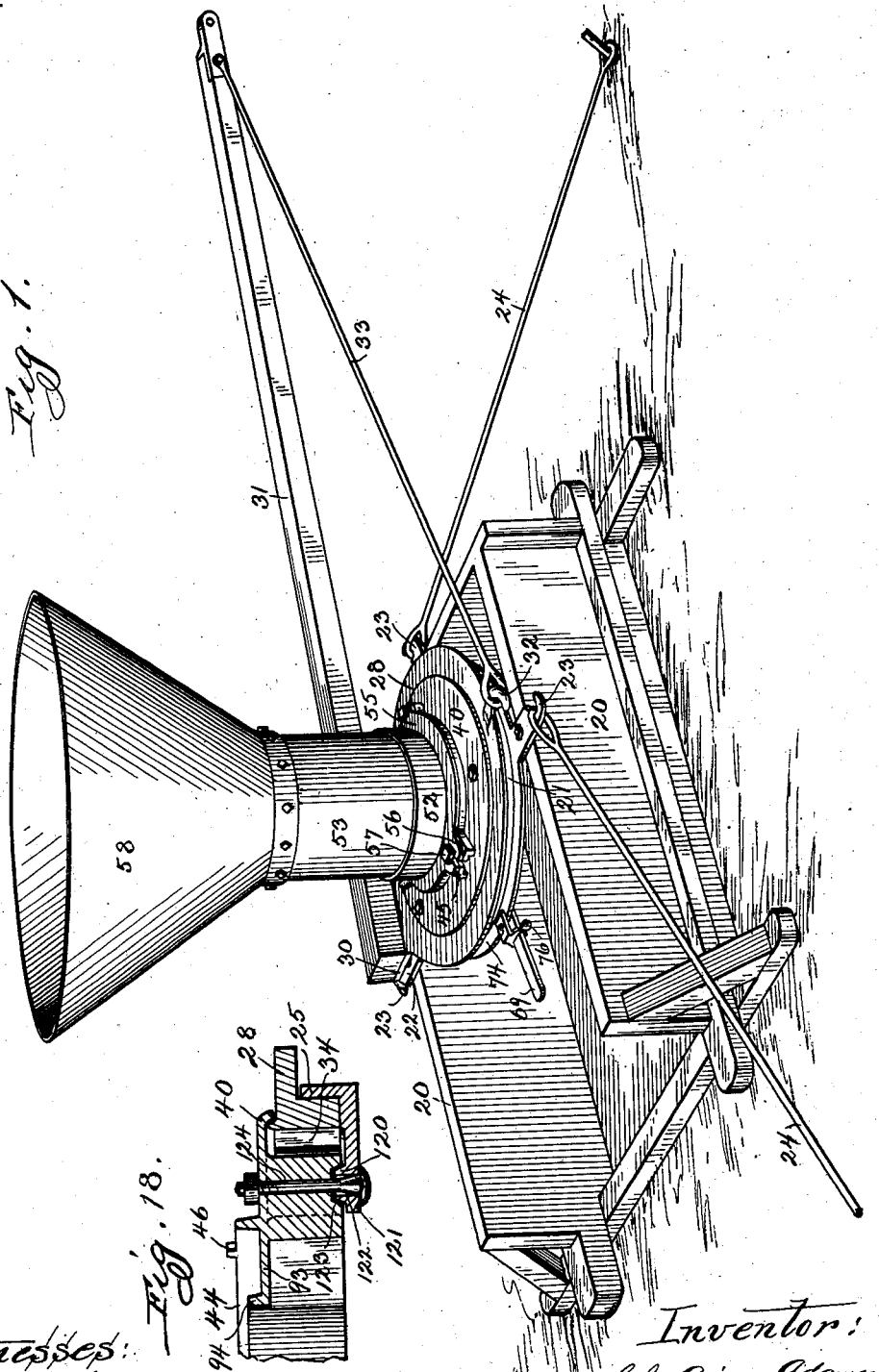

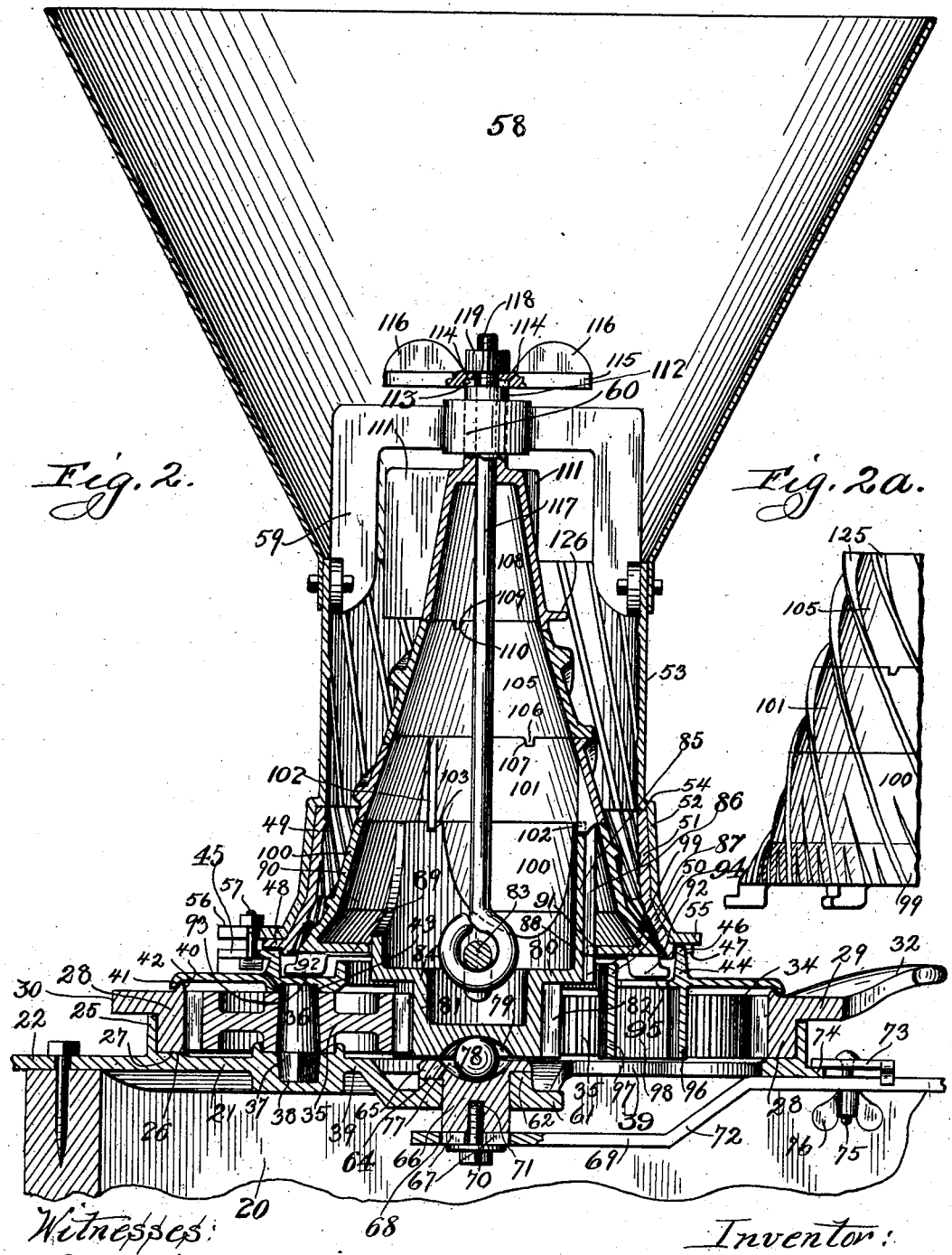

No. 744,705. PATENTED NOV. 24, 1903.
J. Q. ADAMS.
GRINDING MILL.
APPLICATION FILED MAY 17, 1901.
NO MODEL. 4 SHEETS—SHEET 4.
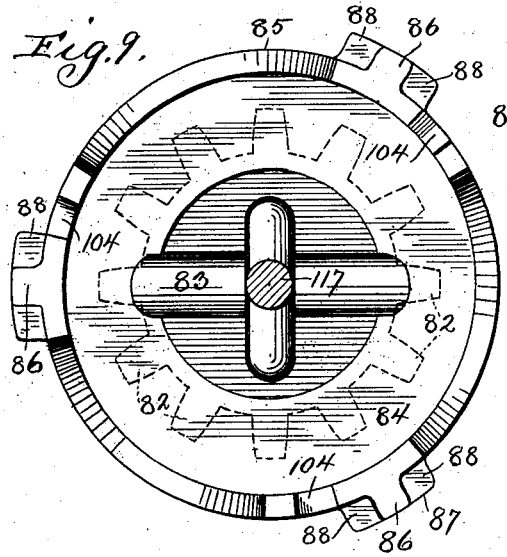
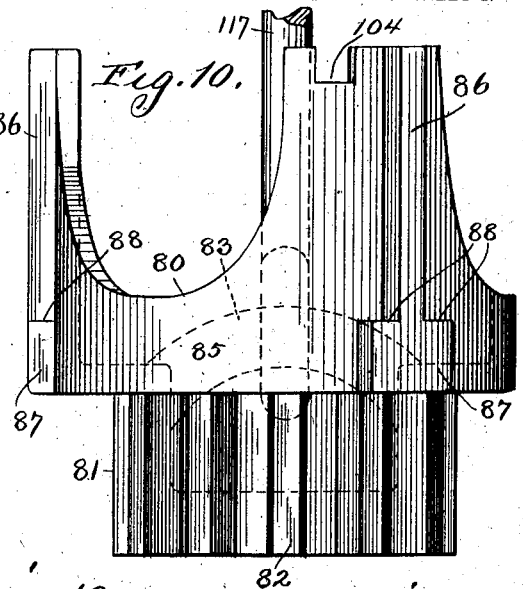
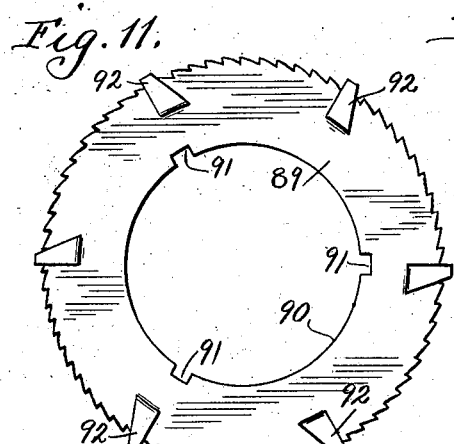
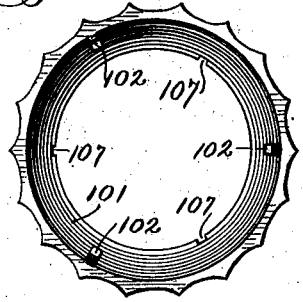
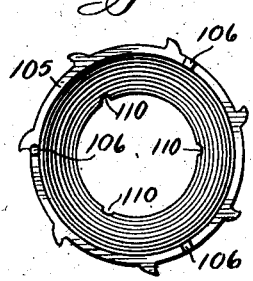
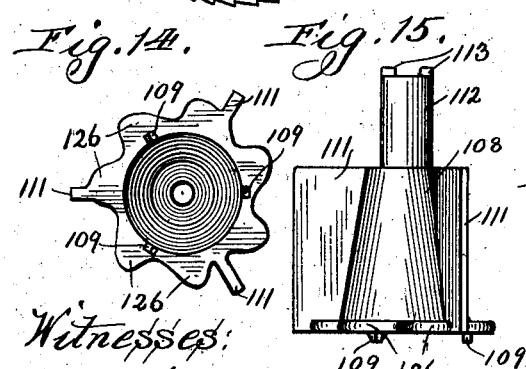
Witnesses:
R. J. Jacker.
R. S. Clemage.
Inventor:
John Quincey Adams,
By Coburn, McRoberts & McElroy,
Attys.

No. 744,705. Patented November 24, 1903.

UNITED STATES PATENT OFFICE.

JOHN Q. ADAMS, OF MARSEILLES, ILLINOIS.

GRINDING-MILL.

SPECIFICATION forming part of Letters Patent No. 744,705, dated November 24, 1903.

Application filed May 17, 1901. Serial No. 60,649. (No model.)

*To all whom it may concern:*

Be it known that I, JOHN QUINCY ADAMS, a citizen of the United States, residing in Marseilles, in the county of Lasalle and State of Illinois, have invented certain new and useful Improvements in Grinding-Mills, of which the following is a specification.

My invention is concerned with improvements in the construction of grinding-mills such as are adapted to grind corn and other forms of feed and is intended to provide for the ready adjustment of the inner bur relative to the outer one and to provide a cheap and simple construction of the parts, all as will be fully described in the following specification and particularly pointed out in the claims.

Referring to the accompanying sheets of drawings, in which the same reference characters are used to designate identical parts in all the figures, Figure 1 is a perspective view of the complete mill. Fig. 2 is a central section through the body of the mill. Fig. 2ª is a side elevation of a portion of the inner bur. Fig. 3 is a plan view of the supporting base-plate of the machine. Fig. 4 is a plan view of the master-gear. Fig. 5 is a plan view of the covering base-plate. Fig. 6 is an inverted plan view of the vertical movable bearing-cup by which the inner bur is raised or lowered. Fig. 7 is a perspective view of one of the bearing-studs for the idle gear. Fig. 8 is a perspective view of the adjusting-lever. Fig. 9 is a plan view of the bur-gear casting. 3 Fig. 10 is a side elevation of the same. Fig. 11 is an inverted plan view of the bottom section of the inner bur. Fig. 12 is an inverted plan view of the next to the bottom section of the bur. Fig. 13 is an inverted plan view of the next to the top section of the bur. Fig. 14 is an inverted plan view of the top section of the bur. Fig. 15 is a side elevation of the same. Fig. 16 is a top plan view of the pair of feeding-wings, and Fig. 17 is an inverted plan view of the annulus constituting the lower portion of the stationary outer bur.

The scale of the different figures is not uniform, as some of the detail views are on a larger scale than others in order to better illustrate some of the details of construction.

Referring to Fig. 1, 20 represents the rectangular wooden framework, open at one end, upon which machines of this kind are ordinarily supported. This has bolted thereon by its arms 22 the base-plate 21, and these arms 22 preferably terminate in the hooks 23, over the end of which the guy-rods 24 are passed to securely anchor the mill in the place where it is to be used. Journaled in the cup formed by the vertical annular flange 25 and resting upon the horizontal annular bearing-surface 26 is the annular bearing edge 27 of the master-gear 28, which, as will be seen from Figs. 2 and 4, consists of the substantially annular horizontal portion 29, provided with the rectangular offset 30, upon which the end of the tongue 31 is secured, and the oppositely-disposed hook 32, upon which is secured one end of the tie-rod 33, the other end of which is secured to the outer end of the tongue 31. The vertical flange of the master-gear has formed on its inner surface the gear-teeth 34, which mesh with the three idle pinions 35, which are journaled upon the bearing-studs 36, which have the squared lower ends 37 set into the correspondingly-shaped sockets 38 in the radial arms 39 of the spider-like supporting base-plate 21. The covering base-plate 40 (shown in plan view in Fig. 5) is of the annular shape shown and has the downwardly-projecting flange 41 at its outer end, which takes over the upwardly-projecting annular flange 42 just inside of it on the master-gear 28. It has formed on the end side thereof the circular sockets or depressions 43, into which the upper ends of the bearing-studs 36 project, these bearing-studs thus having the additional function of supporting the weight of the covering base-plate and the parts above it. This covering base-plate 40 is provided with the outer vertical annular flange 44, which is provided at every one hundred and twenty degrees with the slotted ears 45. Intermediate of these slotted ears are the lugs 46, which take into the corresponding recesses 47, formed in the horizontal flange 48, projecting outward from the bottom of the annulus 49, which constitutes the lower portion of the stationary outer bur. (Shown in inverted plan view in Fig. 17.) This annulus 49 is of the shape shown in section in Fig. 2 and has the outwardly-inclined lower portion 50 and the substantially vertical upper portion 51, and its inner face is corrugated, as shown, and the metal of which it is composed is chilled to give it the greatest possible hardness, as the heaviest portion of the grinding is done between this portion of the outer bur and the adjacent portion of the inner bur. Resting upon this annulus 49 is the correspondingly-shaped lower end 52 of the tubular casting 53, constituting the main portion of the stationary outer bur. This casting is offset, as seen at 54, where it rests on the annulus 49, so that the corrugated inner surface of the annulus 49 is practically continuous with the corrugated inner surface of the tubular casting 53. The bottom of this casting terminates in the annular horizontal flange 55, which is provided with the slotted ears 56, which are placed directly over the slotted ears 45, so that the bolts 57, passing through the slotted ears 45 and 56, serve to clamp the tubular casting 53 securely to the covering base-plate 40, with the annulus 49 interposed between them in the manner described. Bolted to the upper end of the tubular casting 53 is the funnel-shaped metallic hopper 58, into which the corn or other material to be ground is thrown. Also bolted to the inside of the casting 53 is the yoke 59, which is of the shape clearly shown in Fig. 2 and which is provided at its center with the enlargement 60, which is bored to form a bearing for the upper end of the inner revolving bur.

The supporting-base 21 has formed at the center thereof and supported by the radial arms 39 the annulus 61, which has the annular cam-flange 62, forming the inner portion thereof. This cam-flange, as best shown in Fig. 3, has its upper face consisting of three cam-surfaces 63, which coöperate with three complementary cam-faces 64, formed on the under surface of the flange 65, projecting outwardly from the outer end of the bearing-cup 66, as best shown in section in Fig. 2. The main portion of this cup 66 extends down through the aperture formed in the annulus 61 of the supporting base-plate and has formed on its lower end the pair of downwardly-projecting squared lugs 67, which take into the elongated squared aperture 68, formed in the inner end of the adjusting-lever 69, so that by passing the set-screw 70 through the slot 68 and into the screw-threaded aperture 71, formed in the bottom of the bearing-cup 66, the adjusting-lever can be securely clamped to the bearing-cup. This adjusting-lever 69 has the bent portion 72 therein, which serves to bring its outer portion directly beneath the annulus of the supporting base-plate, and this adjusting-lever is provided with the overhanging arm 73, secured thereto, which projects over the flange 74, formed on the corresponding edge of the supporting base-plate 21, and by means of the bolt 75 and the thumbnut 76 the arm 73 can be drawn down upon the flange 74 to clamp the lever 69 in any desired position of adjustment. By reason of the cam-faces 63 on the supporting base-plate coöperating with the cam-faces 64 on the bearing-cup it will be apparent that as the adjusted lever 69 is thrown back and forth the bearing-cup 66 will be raised and lowered correspondingly. The upper surface of the bearing-cup is concaved, as shown at 77, and receives the bearing-ball 78, upon which rests the concaved end side 79 of the bur-gear casting 80. This bur-gear casting 80 consists of the cup-shaped lower portion 81, which has the gear-teeth 82, which mesh with the idle pinions 35, formed on its outer surface. A yoke 83 is cast across the top of this cup. Projecting outwardly from the top of the gear portion is the horizontal flange 84, constituting an annulus, which has at its outer edge the vertical annulus 85, which for lightness has some of its upper portion cut away, as clearly shown in Fig. 10. It is provided with the three vertical ribs 86, which terminate at their lower ends in the enlargements 87, thus forming the shoulders 88, upon which rest a portion of the inner edge of the flange 89, forming the bottom of the lowermost section 90 of the bur. This annulus 89 has the recesses 91 in the edges thereof, into which the ribs 86 take, so as to prevent any rotation of the bur-gear independently of the bur. Projecting downwardly from the outer ends of the flange annulus 89 are the sweeper-lugs 92, which, as seen in Fig. 2, take into the channel 93, formed on the upper side of the covering base-plate 41 between the outer vertical flange 44 and the inner vertical flange 94. At suitable intervals between the idle pinions 35 are formed the discharge-openings 95, into which the ground material which is fed into the channel 93 is swept by the lugs 92. To carry the grinding below the idle pinions 35, surrounding the recesses 95, the flanges 44 and 94 are extended downward, as seen at 96 and 97, and connected by the cross-flanges 98, so as to form a passage for the ground material. As is best seen in the sectional view in Fig. 2, the lowest section 90 of the inner revolving bur has the inclined portion 99, coöperating with the somewhat less inclined portion 50 of the annulus 49, and the inclined portion 100, coöperating with the somewhat less inclined portion 51 of the annulus 49. The ribbed outer surface of this lowermost section is, like the inner surface of its coöperating annulus 49, chilled to make a very hard and efficient grinding-surface. The next to the bottom section 101 of the inner bur is an inclined annulus having its outer surface corrugated or ribbed like the outer surface of the bottom section and provided on its inner surface with the three lugs 102, having the squared lower end, which take into the corresponding recesses 104, formed in the upper end of the vertical flange 85 of the bur-gear casting 80, these lugs and recesses being employed to securely connect the parts together.

The next to the uppermost section 105 of the bur is a hollow frustum of the cone, having the same inclination as the section immediately beneath it, which in turn is the same as that of the upper portion 100 of the lowermost section of the bur. It is provided with the three projections 106 on its under surface, which take into the corresponding recesses 107 in the upper surface of the section 101, these lugs and recesses being spaced apart one hundred and twenty degrees in order to readily position them and at the same time hold them from movement. The outer surface of these three lowermost sections is corrugated, as shown in Fig. 2ª, and these corrugations, as shown, are preferably made deeper at the upper end of the section 105. The uppermost section 108 is hollow, like the other sections, and in the form of a truncated pyramid, having the lugs 109 on its lower edge fitting into the corresponding recesses 110 on the upper edge of the section 105 for the same purpose as the corresponding lugs 106 and recesses 107, previously described. The section 108 is provided with the three wings 111, which serve to start the corn in its downward movement, and if any of it should become wedged across the upper portion of the bur the wings carrying it against the edges of the yoke 59 will break it or otherwise serve to release it and cause it to descend further into the burs. The upper end of the section 108 terminates in the hollow sleeve 112, which has the lugs 113 on its upper end, which project into the recess 114, formed on the under side of the plate 115, which carries the two feeding-wings 116. (Shown in Figs. 2 and 16.) An eyebolt 117 has its eye passed through the yoke 83 and extends up through the sleeve 112 through the aperture 118 in the piece 115 and is provided with the nut 119, by which the various parts constituting the bur are securely clamped together and held from any possible relative movement. With this built-up construction of the bur it will be seen that I have produced an extremely simple device that can be readily cast and assembled in position and any part of which can be readily replaced in case of any breakage.

To assist the bearing-studs 36 in holding the covering base-plate rigid relative to the supporting base-plate, I form the circular lugs 120 on the supporting base-plate projecting upward from the portions 121 of the web of the base-plate. These projections 120 have the squared apertures 122 therein, adapted to receive the squared end of the bolt. Coöperating with these lugs or projections 120 are the sleeves 123, (shown in dotted lines in Fig. 5), which project downwardly from the covering base-plate 40 over the projections 120 and have their lower end resting on the web 121. Bolts are passed through the apertures 122, through the sleeves 123, and through the apertures 124 above them in the covering base-plate 40, and by means of nuts coöperating with bolts the covering base-plate and the supporting base-plate can be securely clamped together.

As best seen in Fig. 2ª, the ribs 125 on the revoluble bur are set at the customary incline and have their upper ends projecting farther out from the body than the lower portion, so as to bring them closer to the stationary bur. The upper ends, as seen in Fig. 2ª, being square and projecting forwardly would tend to catch the husks and start them to winding about the bur, and to prevent this I form the projections 126 on the bottom of the uppermost section, one for each rib 125, covering the upper end thereof and preventing any of the husks from catching thereon.

While I have shown my invention as embodied in the form which I at present consider best adapted to carry out its purposes, it will be understood that it is capable of modifications and that I do not desire to be limited in the interpretation of the following claims, except as may be necessitated by the state of the prior art.

What I claim as new, and desire to secure by Letters Patent of the United States, is—

1. In a device of the class described, the combination of the cylindrical stationary bur, with the inner bur mounted to rotate therein on a vertical axis, the supporting base-plate, the bearing-cup supported by said base-plate and supporting the bottom of the inner bur, and means for adjusting the cup vertically while the mill is in motion comprising the cam-flanges on the cup and complementary surfaces on the base-plate, together with means for rotating said cup; substantially as described.

2. In a device of the class described, the combination of the cylindrical stationary bur, with the inner bur mounted to rotate therein on a vertical axis, the supporting base-plate, the bearing-cup supported by said base-plate and supporting the bottom of the inner bur, and means for adjusting the cup vertically while the mill is in motion comprising the cam-flanges on the cup and complementary surfaces on the base-plate, together with means for rotating said cup consisting of the lever secured to the base of the cup, extending beyond the periphery of the base-plate and provided with means for securing it to said base-plate in any position of adjustment; substantially as described.

3. In a device of the class described, the combination of the rotary bur, with the bearing-cup by which it is supported, said cup being T-shaped in cross-section and having the annular cam-surfaces on the under side thereof, the supporting base-plate having the complementary surfaces with which the cam-surfaces coöperate surrounding an aperture through which the vertical portion of the cup passes, and means for rotating said cup while the mill is in motion; substantially as described.

4. In a device of the class described, the combination of the rotary bur, with the bearing-cup by which it is supported, said cup being T-shaped in cross-section and having the annular cam-surfaces on the under side thereof, the supporting base-plate having the complementary surfaces with which the cam-surfaces coöperate surrounding an aperture through which the vertical portion of the cup passes, and means for rotating said cup while the mill is in motion comprising the lever secured to the bottom of the cup beneath the base-plate, extending beyond the periphery thereof, an arm on the lever, and means for clamping the lever and arm to the base-plate for securing the lever in any desired position of adjustment; substantially as described.

5. In a device of the class described, the combination with the bur-gear casting having the yoke thereon, with the hollow bur-sections supported thereon, connections between said casting and sections to prevent any relative movement when the parts are assembled, and the eyebolt extending from said yoke through the sections and provided with the nut for clamping said sections together; substantially as described.

6. In a device of the class described, the combination with the bur-gear casting having the yoke thereon, with the hollow bur-sections supported thereon, the feeding-wings surmounting the uppermost bur-section, connections between said castings, sections, and feeding-wings to prevent any relative movement when the parts are assembled, and the eyebolt extending from said yoke through the sections and feeding-wings, and provided with the nut for clamping said parts together; substantially as described.

7. In a device of the class described, the combination with the bur-gear casting having the yoke thereon, with the hollow bur-sections supported thereon, said casting and sections being provided with the coöperating lugs and recesses, substantially as shown, to prevent any relative movement when the parts are assembled, and the eyebolt extending from said yoke through the sections and provided with the nut for clamping said sections together; substantially as described.

8. In a device of the class described, the combination of the supporting base-plate, with the idle pinions supported thereby, the master-gear journaled on said plate and meshing with the idle pinions, the stationary bur supported by said base-plate above the idle pinions, and the revoluble inner bur made up of hollow sections clamped together by the rod 117 and the lowermost one consisting of the bur-gear casting meshing with the idle pinions; substantially as described.

9. In a device of the class described, the combination with the covering base-plate having the annular flange 44 on its upper surface provided with the ears 45 and lugs 46, of the hollow cylindrical bur above it having the flange 55 with the ears 56, and the annulus 49 having the flange 48 between the flanges 44 and 55 with the recesses 47 coöperating with the lugs 46; substantially as described.

10. In a device of the class described, the combination with the supporting base-plate, of the master-gear mounted to rotate thereon, the radially-arranged idle pinions meshing with the master-gear, the covering base-plate having the annular channel formed therein by the flanges 44 and 94, the discharge-openings 95 in said channel between the idle pinions, the flanges on the under side of the covering base-plate surrounding said openings and forming channels extending below the idle pinions, the hollow cylindrical stationary bur supported above the covering base-plate, and the bur mounted to rotate therein and having the gear on the bottom meshing with said idle pinions and the sweeping-lugs 92 coöperating with the channel; substantially as described.

11. In a device of the class described, the combination with the supporting base-plate having the angular sockets 38 therein, of the bearing-studs 36 having their lower ends similarly shaped to fit in said sockets, the master-gear mounted to rotate on said base-plate, the idle pinions on said studs, the inner bur mounted to rotate on said base-plate and having the gear on the bottom thereof meshing with said idle pinions, and the covering base-plate resting on said studs and carrying the outer stationary bur.

12. In a device of the class described, the combination with the supporting base-plate having the angular sockets 38, the apertures 120 therein, of the bearing-studs 36 having their lower ends shaped to fit in said sockets 38, the master-gear mounted to rotate on said base-plate, the idle pinions on said studs, the inner bur mounted to rotate on said base-plate and having the gear on the bottom thereof meshing with said idle pinions, the covering base-plate resting on said studs and having the collars 123 projecting from the under side thereof and resting on said supporting base-plate, and the bolts 124 clamping said base-plates together; substantially as and for the purpose described.

13. In a device of the class described, the combination with the supporting base-plate having the non-cylindrical sockets 38 therein, of the bearing-studs 36 having their lower ends similarly shaped to fit in said sockets, the master-gear mounted to rotate on said base-plate, the idle pinions on said studs, the inner bur mounted to rotate on said base-plate and having the gear on the bottom thereof meshing with said idle pinions, and the covering base-plate resting on said studs and carrying the outer stationary bur.

14. In a device of the class described, the combination with the supporting base-plate having the non-cylindrical sockets 38, the apertures 120 therein, of the bearing-studs 36 having their lower ends shaped to fit in said sockets 38, the master-gear mounted to rotate on said base-plate, the idle pinions on said studs, the inner bur mounted to rotate on said base-plate and having the gear on the bottom thereof meshing with said idle pinions, the covering base-plate resting on said studs and having the collars 123 projecting from the under side thereof and resting on said supporting base-plate, and the bolts 124 clamping said base-plates together; substantially as and for the purpose described.

In witness whereof I hereunto set my hand in the presence of two witnesses.

JOHN Q. ADAMS.

Witnesses:
JOHN H. McELROY,
R. S. CLEMAGE.